United States Patent
Christy (10) Patent No.: US 12,080,446 B2
(45) Date of Patent: Sep. 3, 2024

(54) FLEXIBLE GROMMET ASSEMBLY (71) Applicant: THE BOEING COMPANY, Chicago, IL (US)

(72) Inventor: Stephen Christy, Summerville, SC (US)

(73) Assignee: THE BOEING COMPANY, Chicago, IL (US)

( * ) Notice: Subject to any disclaimer, the term of this patent is extended or adjusted under 35 U.S.C. 154(b) by 41 days.

(21) Appl. No.: 18/063,461

(22) Filed: Dec. 8, 2022

(65) Prior Publication Data

US 2024/0194378 A1 Jun. 13, 2024

(51) Int. Cl.
*H01B 17/58* (2006.01)
*H02G 3/22* (2006.01)

(52) U.S. Cl.
CPC ............. *H01B 17/583* (2013.01); *H02G 3/22* (2013.01)

(58) Field of Classification Search
CPC ....... H01B 17/583; H01B 17/586; H02G 3/22
See application file for complete search history.

(56) References Cited

U.S. PATENT DOCUMENTS

| 3,372,441 | A | * | 3/1968 | Fisher | F16B 21/088 |
| | | | | | 24/713.6 |
| 4,041,241 | A | * | 8/1977 | Olmstead | H02G 3/088 |
| | | | | | 277/627 |
| 5,627,342 | A | * | 5/1997 | Kramer | H02G 3/083 |
| | | | | | 174/152 G |
| 5,647,107 | A | | 7/1997 | Brewster | |
| 6,143,983 | A | * | 11/2000 | Burton | H02G 3/18 |
| | | | | | 174/669 |
| 6,223,390 | B1 | * | 5/2001 | LoTufo | A47F 7/163 |
| | | | | | 24/713.6 |
| 8,507,798 | B2 | * | 8/2013 | Sempliner | H02G 3/185 |
| | | | | | 174/152 G |
| 10,930,413 | B2 | * | 2/2021 | Kitahara | H02G 3/0616 |
| 11,242,014 | B2 | * | 2/2022 | Arnesson | H02G 3/0406 |
| 11,387,019 | B2 | * | 7/2022 | Joshi | H01B 17/583 |
| 11,433,832 | B2 | * | 9/2022 | Kanna | B60R 16/0222 |
| 11,451,025 | B2 | * | 9/2022 | Teece | F16B 37/0857 |
| 11,472,352 | B2 | * | 10/2022 | Yamaguchi | H02G 3/305 |
| 2010/0050374 | A1 | * | 3/2010 | Abare | H02G 3/22 |
| | | | | | 264/145 |

(Continued)

FOREIGN PATENT DOCUMENTS

DE 3446091 C2 10/1986
DE 102008041071 A1 3/2010

OTHER PUBLICATIONS

Extended European Search Report received for related EP App. No. 23201790 dated Mar. 25, 2024 (8 pages).

*Primary Examiner* — Jeffrey O'Brien
(74) *Attorney, Agent, or Firm* — Philip S. Hof; The Small Patent Law Group LLC (57) ABSTRACT

A flexible grommet assembly includes a first grommet body and a second grommet body. The first grommet body includes first articulated segments that define a first hinge region. The second grommet body includes second articulated segments that define a second hinge region. The first and second grommet bodies are configured to cooperatively couple to an opening of a panel such that the first and second grommet bodies are flexed about their respective first and second hinge regions to conform to a curvature in the panel.

19 Claims, 7 Drawing Sheets

(56) References Cited

U.S. PATENT DOCUMENTS

| | | | |
|---|---|---|---|
| 2015/0360629 A1* | 12/2015 | Sekino | B60R 16/037 |
| | | | 174/68.3 |
| 2020/0130552 A1 | 4/2020 | Power et al. | |
| 2021/0285574 A1* | 9/2021 | Guillette | F16L 5/10 |
| 2022/0170492 A1* | 6/2022 | Benthien | B64C 7/00 |
| 2022/0216649 A1* | 7/2022 | Ehmann | H02G 3/22 |
| 2023/0166677 A1* | 6/2023 | Kobayashi | H01B 17/58 |
| | | | 174/152 G |
| 2024/0063619 A1* | 2/2024 | Godard | H02G 3/088 |

* cited by examiner

FLEXIBLE GROMMET ASSEMBLY

FIELD OF THE DISCLOSURE

Embodiments of the present disclosure generally relate to grommets that couple to panels and surround one or more objects that extend through the panels.

BACKGROUND OF THE DISCLOSURE

Grommets are installed on panels at openings in the panel to protect an interface between a panel edge of the opening and the one or more objects that are routed through the opening. Typically, grommets are used to protect wires and wire harnesses from damage due to rubbing along the rough texture of the panel edge. Some industries and applications may require the use of grommets when routing electrical wires through panels. Known snap grommets, which include two parts that snap together to sandwich the panel, are designed for planar panels, and may not function well if the panel is curved. For example, the two parts of known snap grommets may not be able to couple together on a curved panel due to the latching features not properly aligning. Even if the known snap grommet could couple to the curved panel, the snap grommet would not conform to the curved contour, which would frustrate the purpose of the snap grommet. For example, along a concave surface, the snap grommet may separate from the panel edge, which could allow the wires to rub against the rough panel edge.

A conventional process of installing grommets on curved panels is to glue the grommet in place, rather than use a snap grommet. For example, a mechanic may measure and cut a grommet to size, and then glue the grommet to the curved panel. This process is time-consuming, considering the assembly time and cure time. The use of adhesive can also be messy, requiring an additional clean-up step.

SUMMARY OF THE DISCLOSURE

A need exists for a flexible snap grommet assembly that can be universally applied on planar panels and curved panels, while reliably and satisfactorily protecting the objects that extend through the panel opening.

With those needs in mind, certain embodiments of the present disclosure provide a flexible grommet assembly that includes a first grommet body and a second grommet body. The first grommet body includes first articulated segments that define a first hinge region. The second grommet body includes second articulated segments that define a second hinge region. The first and second grommet bodies are configured to cooperatively couple to an opening of a panel such that the first and second grommet bodies are flexed about their respective first and second hinge regions to conform to a curvature in the panel.

Certain embodiments of the present disclosure provide an aircraft that includes an interior cabin and a flexible grommet assembly. The interior cabin includes a curved panel that defines an opening therethrough. The flexible grommet assembly is installed on the curved panel. The flexible grommet assembly includes a first grommet body and a second grommet body. The first grommet body includes first articulated segments that define a first hinge region, and the second grommet body includes second articulated segments that define a second hinge region. The first and second grommet bodies are configured to cooperatively couple to the opening of the curved panel such that the first and second grommet bodies are flexed about their respective first and second hinge regions to conform to a curvature in the curved panel.

Certain embodiments of the present disclosure provide a method of installing a flexible grommet assembly on a panel. The method includes positioning a first grommet body along a first side of a panel at an opening that extends through the panel, and positioning a second grommet body along a second side of the panel at the opening. The second side is opposite the first side. The first grommet body includes first articulated segments that define a first hinge region. The second grommet body includes second articulated segments that define a second hinge region. The method includes coupling the first and second grommet bodies together through the opening such that the first and second grommet bodies are flexed about their respective first and second hinge regions to conform to a curvature in the panel.

BRIEF DESCRIPTION OF THE DRAWINGS

These and other features, aspects, and advantages of the present disclosure will become better understood when the following detailed description is read with reference to the accompanying drawings in which like numerals represent like parts throughout the drawings, wherein.

DETAILED DESCRIPTION OF THE DISCLOSURE

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features.

Moreover, unless explicitly stated to the contrary, embodiments "comprising" or "having" an element or a plurality of elements having a particular condition can include additional elements not having that condition.

Examples of the present disclosure provide a flexible grommet assembly that can flex to conform to a curved panel onto which the flexible grommet assembly is installed. For example, the flexible grommet assembly includes integrated flexible hinges within the respective bodies of first and second grommets of the flexible grommet assembly. The hinges enable the flexible grommet assembly to be installed on flat panels as well as curved panels (e.g., concave or convex), without customizing the grommet assembly. For example, upon snapping the grommet assembly onto a curved panel, the flexible hinges enable the first and second grommet bodies to follow the contour of the panel and remain in contact with an edge of a panel opening. By remaining in intimate proximity of the panel edge, the first and second grommet bodies protect one or more objects that pass through the panel opening, such as wires, from damage caused by rubbing against the panel edge. The flexible grommet assembly is designed to be quickly installed by snapping the first and second grommet bodies together from opposite sides of the panel. The flexible grommet assembly can avoid drawbacks associated with installing custom grommets on curved panels, including the effort, cost, safety risk, and/or clean-up attributable to measuring, cutting, and gluing the grommet into place. The installation of the flexible grommet assembly, according to the examples herein, on a curved panel may be substantially quicker, easier, cheaper, cleaner, and/or safer than the known process that involves cutting and gluing. A curved panel as described herein refers to a non-planar section of a panel that surrounds and defines an opening or pass-through window for receiving wires and/or other objects therethrough.

Figure 1:
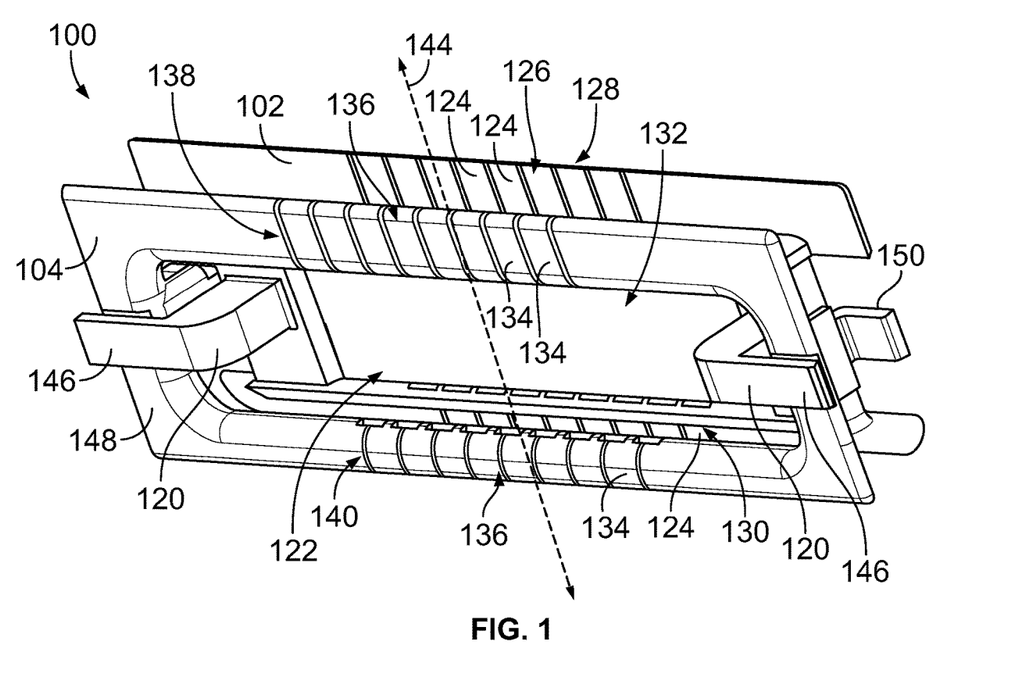
FIG. 1 is an isometric view of a flexible grommet assembly according to an embodiment.

FIG. 1 is an isometric view of a flexible grommet assembly 100 according to an embodiment. The flexible grommet assembly 100 includes a first grommet body 102 and the second grommet body 104. The first and second grommet bodies 102, 104 are discrete, separate components that are designed with complementary features to cooperatively couple to each other and attach to an opening of a panel. FIG. 1 shows the grommet bodies 102, 104 in the coupled state. The grommet bodies 102, 104 are designed to couple to each other through the panel opening.

Figure 2:
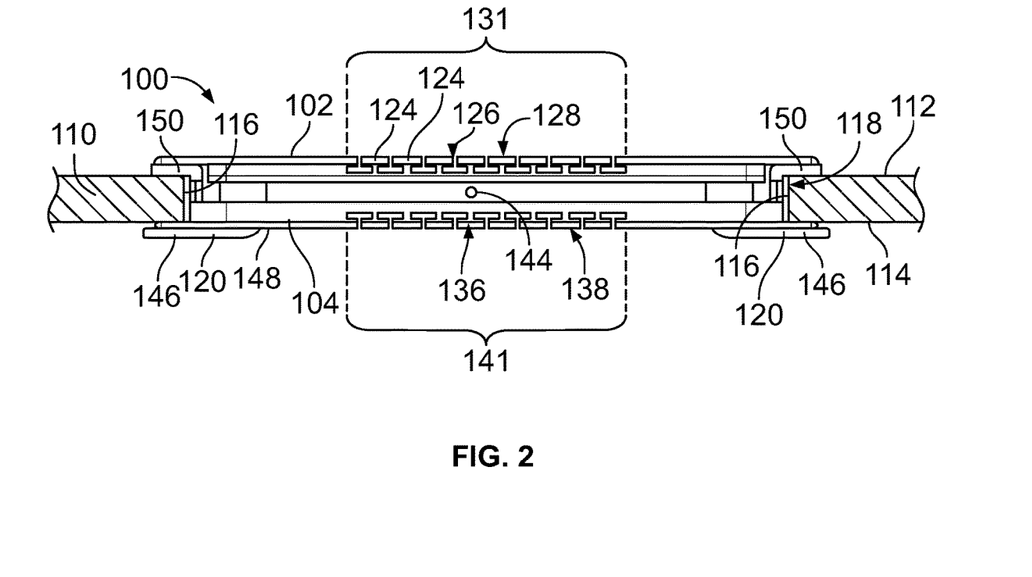
FIG. 2 is a plan view of the flexible grommet assembly installed on a panel.

FIG. 2 is a plan view of the flexible grommet assembly 100 installed on a panel 110. The panel 110 is shown in cross-section in FIG. 2 to avoid obstructing the view of the flexible grommet assembly 100. The panel 110 has a first side 112 and a second side 114 opposite the first side 112. The panel 110 may have a one-piece construction or may be a composite. The panel 110 includes an edge 116 that defines an opening 118. The opening 118 extends through a thickness of the panel 110 from the first side 112 to the second side 114. The section of the panel 110 shown in FIG. 2 is planar. As described above, the flexible grommet assembly 100 is designed to flex and bend, if necessary, to conform to curved panel sections. When installed on the panel 110, the first and second grommet bodies 102, 104 are in the coupled state as shown in FIG. 1 and sandwich the panel 110. Portions of the grommet bodies 102, 104 extend through the opening 118 to engage and secure to the respective opposing grommet body 102, 104. The following description refers to both FIGS. 1 and 2.

The first grommet body 102 includes first latch features 120 and defines a first passageway 122 (e.g., grommet opening). The first passageway 122 aligns with the opening 118 of the panel 110 when installed and receives wires and/or other objects therethrough. In the illustrated embodiment, the first grommet body 102 is box-shaped, and the first passageway 122 is framed by the box-shaped first grommet body 102. The first passageway 122 is obstructed from view in FIG. 2 by an upper segment of the first grommet body 102. The first latch features 120 are designed to extend through the opening 118 of the panel 110 and couple to the second grommet body 104 to secure the flexible grommet assembly 100 onto the panel 110. For example, the first latch features 120 may prohibit the first and second grommet bodies 102, 104 from being pulled away from each other, which secures both grommet bodies 102, 104 to the panel 110 sandwiched therebetween.

The first grommet body 102 includes first articulated segments 124 that collectively represent a first flexible hinge region 126. In an embodiment, the articulated segments 124 are integral portions of the first grommet body 102 that are formed by the presence of negative spaces along the body 102. For example, the articulated segments 124 may not be discrete elements that are attached to the first grommet body 102 after the first grommet body 102 is formed. The articulated segments 124 may be inherently formed during a manufacturing process that generates the first grommet body 102, such that the articulated segments are formed concurrently with other portions of the first grommet body 102. The negative spaces may include slits, holes (referred to herein as cutouts), and/or the like. The first flexible hinge region 126 includes multiple articulated segments 124 in a row. The articulated segments 124 in the row are defined, and separated from each other, by the negative spaces. In an embodiment, as shown in greater detail in FIGS. 3, 6, and 7, the first flexible hinge region 126 includes a first set 128 of the first articulated segments 124 and a second set 130 of the first articulated segments 124. The first and second sets 128, 130 are disposed on opposite sides of the passageway 122. In the illustrated orientation in FIG. 1, the first set 128 is above the passageway 122 and the second set 130 is below the passageway 122. Each of the first and second sets 128, 130 is arranged in a row. The two rows may be parallel. The first set 128 laterally aligns with the second set 130 along a lateral length of the first grommet body 102. In an example, the first and second sets 128, 130 are located at a middle section 131 of the first grommet body 102 along the lateral length, such that the flexible hinge region 126 is disposed at the middle section 131.

The second grommet body 104 defines a second passageway 132 (e.g., grommet opening) that aligns with the opening 118 of the panel 110 when installed and receives the wires and/or other objects therethrough. In the illustrated embodiment, the second grommet body 104 is box-shaped, and the second passageway 132 is framed by the box-shaped second grommet body 104. The second passageway 132 is obstructed from view in FIG. 2 by an upper segment of the second grommet body 104.

The second grommet body 104 includes second articulated segments 134 that collectively represent a second flexible hinge region 136. The first and second flexible hinge regions 126, 136 of the flexible grommet assembly 100 are designed to flex to conform to the curvature, if any, of the panel 110. In the illustrated embodiment in which the panel 110 is planar, the flexible hinge regions 126, 136 are planar (e.g., linear). If the panel 110 is curved, the first and second grommet bodies 102, 104 may bend along the flexible hinge regions 126, 136 to enable the grommet bodies 102, 104 to remain in contact with, or at least close proximity (e.g., within 1 mm or 2 mm) of, the edge 116 of the panel 110 along the entire perimeter of the opening 118. The flexible grommet assembly 100 can protect the wires or other objects that extend through the opening 118 from rubbing against the rough, unfinished edge 116 of the panel 110, regardless of whether the panel 110 is planar or curved. The first and second flexible hinge regions 126, 136 may laterally align with each other when the first and second grommet bodies 102, 104 are coupled together, as shown in FIGS. 1 and 2. The flexible hinge regions 126, 136 enable the flexible grommet assembly 100 to flex in two directions about a central axis 144. The flexible hinge regions 126, 136 may also provide increased flexibility in other dimensions. For example, the flexible hinge regions 126, 136 may support twisting of the flexible grommet assembly 100 about a lateral axis that is perpendicular to the central axis 144.

The articulated segments 134 may be integral portions of the second grommet body 104 that are formed by the presence of negative spaces along the second grommet body 104. For example, the articulated segments 134 may not be discrete elements that are attached to the second grommet body 104 after the second grommet body 104 is formed. The articulated segments 134 may be inherently formed during a manufacturing process that generates the second grommet body 104, such that the articulated segments are formed concurrently with other portions of the second grommet body 104. The negative spaces may include slits, cutouts, and/or the like. The second flexible hinge region 136 includes multiple articulated segments 134 in a row. The articulated segments 134 in the row are defined, and separated from each other, by the negative spaces. As shown in FIG. 2, the first articulated segments 124 of the first grommet body 102 and the second articulated segments 134 of the second grommet body 104 may be T-shaped.

Figure 8:
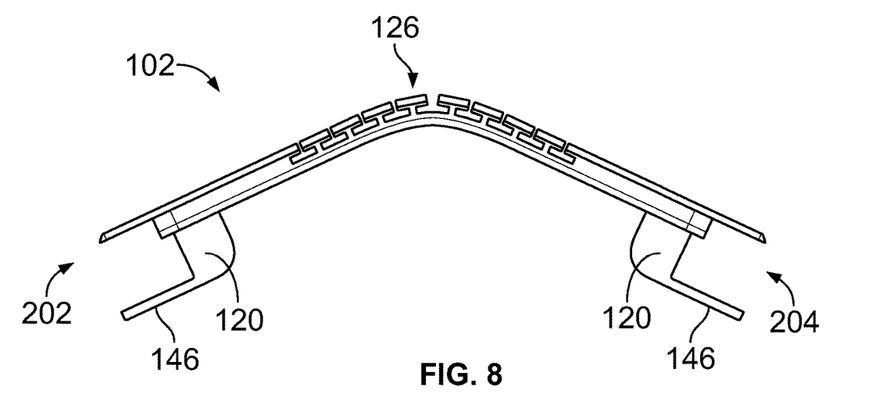
FIG. 8 is a plan view of the first grommet body in a flexed state.
Figure 9:
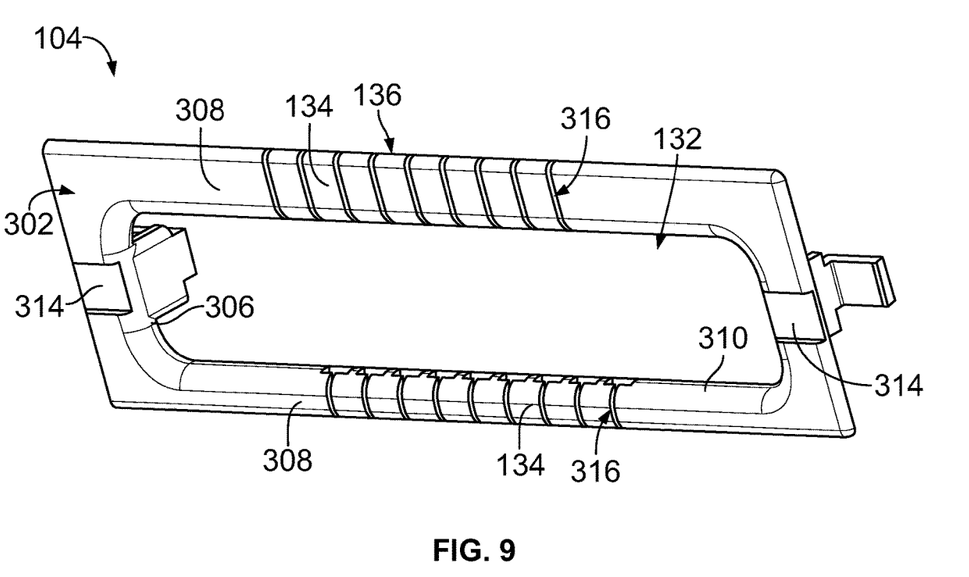
FIG. 9 is an isometric view of an exterior end of a second grommet body of the flexible grommet assembly shown in FIGS. 1 and 2.

In an embodiment, as shown in greater detail in FIGS. 8 and 9, the second flexible hinge region 136 includes a first set 138 of the second articulated segments 134 and a second set 140 of the second articulated segments 134. The first and second sets 138, 140 are disposed on opposite sides of the passageway 132. In the illustrated orientation in FIG. 1, the first set 138 is above the passageway 132, and the second set 140 is below the passageway 132. Each of the first and second sets 138, 140 is arranged in a row. The two rows may be parallel. The first set 138 laterally aligns with the second set 140 along a lateral length of the second grommet body 104. In an example, the first and second sets 138, 140 are located at a middle section 141 of the second grommet body 104 along the lateral length, such that the flexible hinge region 136 is disposed at the middle section 141.

In the illustrated embodiment, when in the coupled state, the latch features 120 of the first grommet body 102 extend through the opening 118 in the panel 110 and couple to the second grommet body 104 to secure the flexible grommet assembly 100 onto the panel 110. The first grommet body 102 in FIG. 2 generally aligns with the first side 112 of the panel 110. A portion of the first grommet body 102 may abut against the first side 112. The latch features 120 may protrude beyond the second side 114 of the panel 110. The latch features 120 may be generally hook-shaped with tabs 146 that overlap and contact an exterior side 148 of the second grommet body 104 in the coupled state. Optionally, the tabs 146 may contact the second side 114 of the panel 110 in addition to, or instead of, contacting the exterior side 148 of the second grommet body 104. The first grommet body 102 may be referred to herein as a male grommet body 102 and the second grommet body 104 may be referred to as a female grommet body 104 because the first latch features 120 secure to the second or female grommet body 104.

In an embodiment, the second (e.g., female) grommet body 104 includes second latch features 150. The second latch features 150 may extend through the opening 118 of the panel 110 from the second grommet body 104 which generally aligns with the second side 114 of the panel 110. The second latch features 150 may contact the first side 112 of the panel 110. In the illustrated embodiment, the second latch features 150 secure the second grommet body 104 to the panel 110, and the first latch features 120 couple the first grommet body 102 to the second grommet body 104. The first latch features 120 of the first grommet body 102 may have a different shape and/or size than the second latch features 150 of the second grommet body 104. For example, the first latch features 120 may be larger than the second latch features 150. In a first alternative embodiment, the second latch features 150 may contact and latch onto the first grommet body 102. In a second alternative embodiment, the second grommet body 104 has no latch features. For example, the engagement of the latch features 120 with the second grommet body 104 may secure the two grommet bodies 102, 104 in the coupled state on the panel 110.

Figure 3:
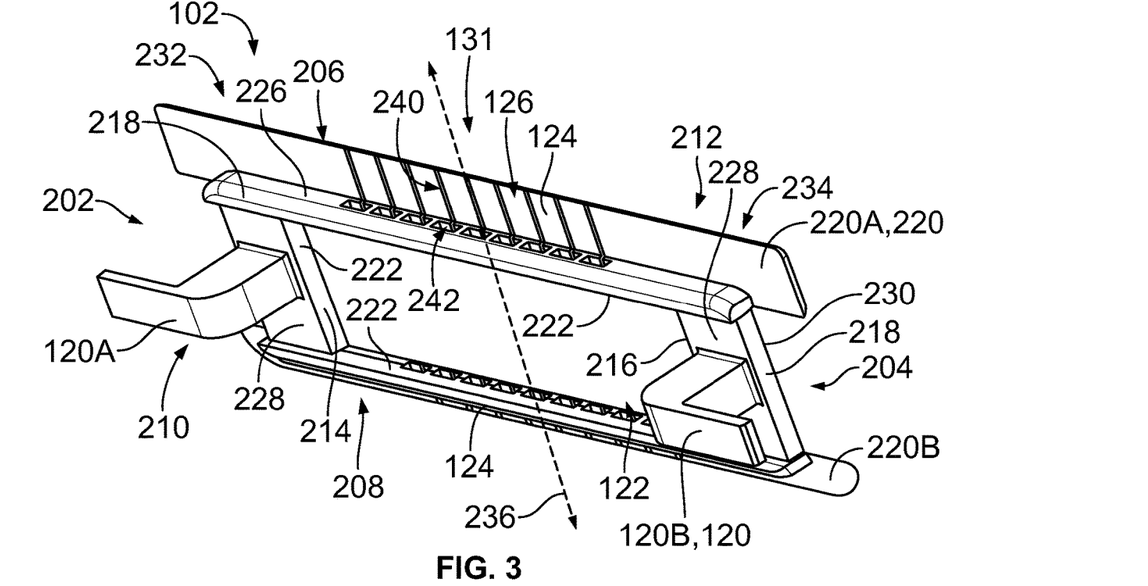
FIG. 3 is an isometric view of a first grommet body of the flexible grommet assembly shown in FIGS. 1 and 2.

FIG. 3 is an isometric view of the first (e.g., male) grommet body 102 of the flexible grommet assembly 100 shown in FIGS. 1 and 2. The first grommet body 102 extends a lateral length from a first lateral end 202 to a second lateral end 204 (opposite the first lateral end 202). In the illustrated embodiment, the first grommet body 102 has an oblong shape. The lateral length of the first grommet body 102 is the greatest dimension of the first grommet body 102. For example, the lateral length is greater than a height of the first grommet body 102 from a top end 206 to a bottom end 208 of the first grommet body 102. The reference to top and bottom ends is merely for identification purposes and does not require a specific orientation of the first grommet body 102 relative to the panel 110. The lateral length is also greater than a depth of the first grommet body 102 from a mating end 210 to an exterior end 212 of the first grommet body 102. The mating end 210 interfaces with the panel 110 and/or the second grommet body 104 when installed, and the exterior end 212 faces away from the panel 110. The passageway 122 defined by the first grommet body 102 may be oblong. The lateral length between a first lateral end 214 of the passageway 122 and a second lateral end 216 of the passageway 122 may be the greatest dimension of the passageway 122. For example, the passageway 122 may be rectangular, elliptical, oval, or the like. In other embodiments, the passageway 122 may be circular, square, or another non-oblong shape.

In an embodiment, the first grommet body 102 includes base 218 and a flange 220. The base 218 has an inner side 222 that defines the perimeter of the passageway 122. The inner side 222 may be relatively narrow/thin. The flange 220 extends from an outer side 226 of the base 218. The outer side 226 is opposite the inner side 222. The base 218 has a mating side 228 and a mounting side 230 that is opposite the mating side 228. The flange 220 may be disposed on the mounting side 230. The flange 220 may be a thin panel. When installed, the flange 220 may overlap the first side 112 of the panel 110 shown in FIG. 2. The flange 220 may abut the first side 112 to block the first grommet body 102 from falling through the opening 118 of the panel 110. The latch features 120 of the first grommet body 102 may project from the mating side 228 of the base 218. The flange 220 optionally may be segmented into a first flange portion 220A and a second flange portion 220B disposed on opposite sides of the passageway 122. Alternatively, the flange 220 may continuously extend around the full perimeter of the passageway 122.

In an example, the first grommet body 102 includes two latch features 120 that are laterally spaced apart from each other. For example, the passageway 122 may be disposed between the two latch features 120. The flexible hinge region 126 may be spaced apart from the latch features 120 along the lateral length. For example, the flexible hinge region 126 may be located between the two latch features 120. The middle section 131, which includes the flexible hinge region 126, may be disposed between a first end segment 232 and a second end segment 234 of the first grommet body 102. The first end segment 232 includes a first (e.g., left) latch feature 120A of the latch features 120 and defines the first lateral end 214 of the passageway 122. The second end segment 234 includes a second (e.g., right) latch feature 120B of the latch features 120 and defines the second lateral end 216 of the passageway 122. The articulated segments 124 of the flexible hinge 126 enable the first grommet body 102 to flex in two directions about a central axis 236 of the first grommet body 102. The central axis 236 may extend along the height of the first grommet body 102.

Figure 4:
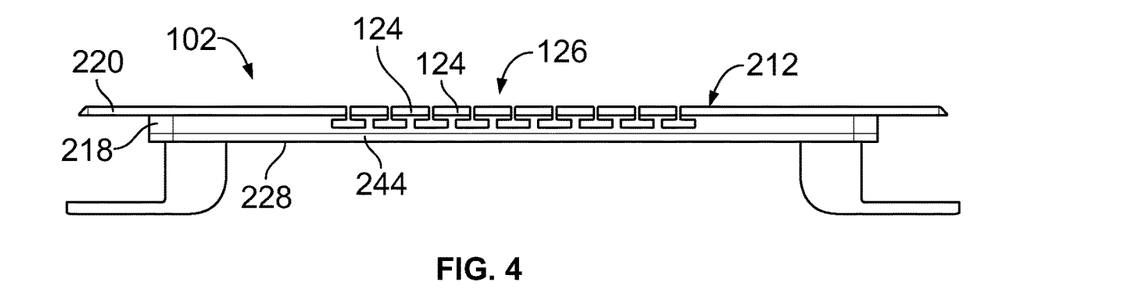
FIG. 4 is a plan view of the first grommet body shown in FIGS. 1 through 3.
Figure 5:
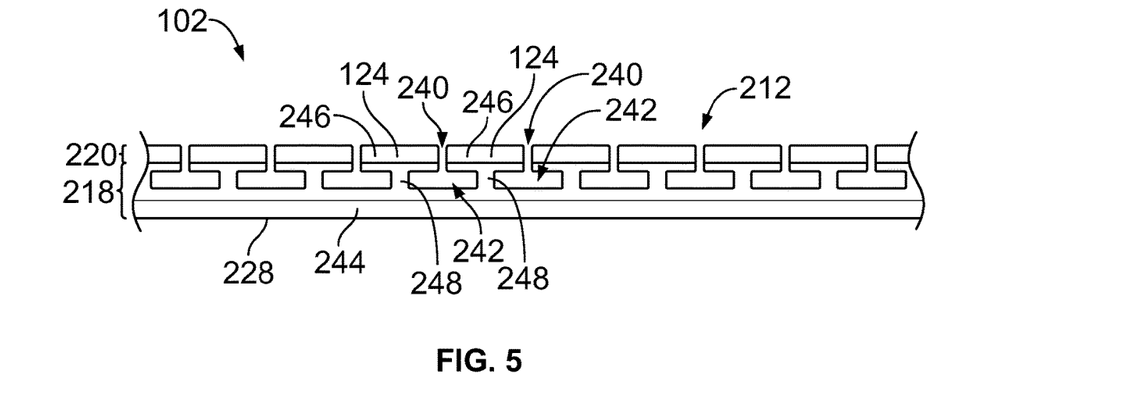
FIG. 5 is an enlarged view of a portion of the first grommet body in FIG. 4, showing a flexible hinge region.

FIG. 4 is a plan view of the first grommet body 102 shown in FIGS. 1 through 3. FIG. 5 is an enlarged view of a portion of the first grommet body 102 in FIG. 4, showing the flexible hinge region 126. In an embodiment, the articulated segments 124 are defined by the base 218 and the flange 220. For example, a first portion of each articulated segment 124 is defined by the flange 220 and a second portion is defined by the base 218. In the illustrated embodiment, the articulated segments 124 are separated from one another by slits 240 and cutouts 242 (e.g., holes). The slits 240 extend through a thickness of the flange 220. The slits 240 are open along the exterior end 212 of the first grommet body 102. The cutouts 242 are defined through the base 218. For example, the cutouts 242 extend through the base 218 from the outer side 226 to the inner side 222. Each cutout 242 may be fluidly connected to one corresponding slit 240 of the slits 240. In an example, the articulated segments 124 are T-shaped, and the slits 240 and cutouts 242 define inverted T-shaped negative spaces between the articulated segments 124.

In an embodiment, the mating side 228 of the base 218 is defined by a continuous strip (e.g., length) 244 of solid material extending around a perimeter of the passageway 122. The T-shaped articulated segments 124 of the flexible hinge region 126 are attached to the continuous strip 244. For example, each articulated segment 124 may include a broad portion 246 and a narrow portion 248. The broad portion 246 has a greater lateral length than the narrow portion 248. The narrow portion 248 is disposed between the broad portion 246 and the continuous strip 244 of the base 218. The articulated segment 124 may be cantilevered such that the broad portion 246 is connected to the continuous strip 244 via the narrow portion 248. The continuous strip 244 may define a flexible joint to which all of the articulated segments 124 are connected. The broad portions 246 of the articulated segments 124 in the row are separated by the slits 240. The narrow portions 248 of the articulated segments 124 in the row are separated by the cutouts 242. In an embodiment, the narrow portions 248 are part of the base 218. The broad portions 246 may be defined by both the base 218 and the flange 220. In an embodiment, when installed on the panel 110, the mating side 228 of the base 218 may extend at least partially into the opening 118 of the panel 110 and the flange 220 remains outside of the opening 118.

Figure 6:
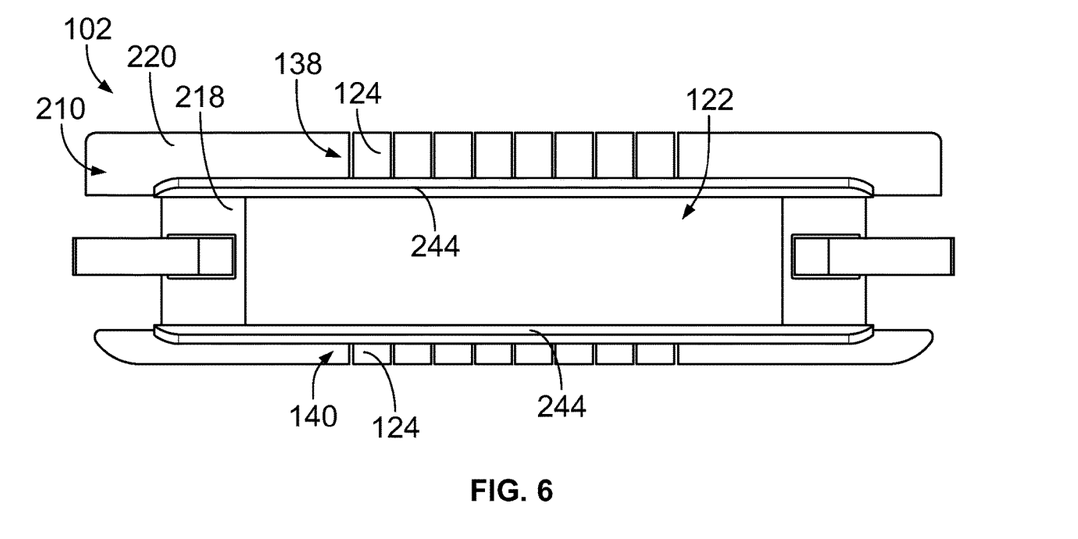
FIG. 6 is an elevation view of a mating end of the first grommet body according to the embodiment shown in FIGS. 1 through 5.
Figure 7:
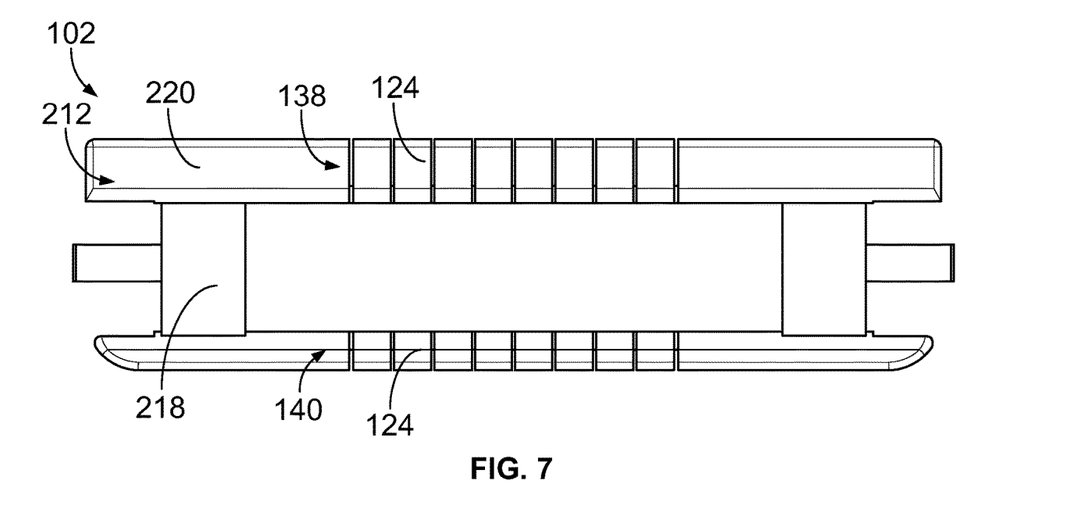
FIG. 7 is an elevation view of an exterior end of the first grommet body shown in FIGS. 1 through 6.

FIG. 6 is an elevation view of the mating end 210 of the first grommet body 102 according to the embodiment shown in FIGS. 1 through 5. FIG. 7 is an elevation view of the exterior end 212 of the first grommet body 102 shown in FIGS. 1 through 6. The elevation views show that the slits 240 extend fully through the thickness of the flange 220 along both the first and second sets 138, 140 of the articulated segments 124 on either side of the passageway 122. The slits 240 may be linear and parallel to one another. For example, the slits 240 may be perpendicular to the lateral length of the first grommet body 102. The slits 240 may not extend through the full thickness of the base 218, as indicated by the solid continuous strip 244 of the base 218 shown in FIG. 6.

FIG. 8 is a plan view of the first grommet body 102 in a flexed state. The first grommet body 102 is bent along the flexible hinge region 126. In the illustrated flexed state, the two latch features 120 are closer together than when the first grommet body 102 is in the non-flexed state shown in FIG. 4. A mechanic or other operator may flex the first grommet body 102 to the flexed state shown in FIG. 8 during the installation process. For example, the mechanic may squeeze the two lateral ends 202, 204 together as the first grommet body 102 is moved towards and into the opening 118 of the panel 110. The closer positioning of the latch features 120 may enable the latch features 120 to clear the edge 116 of the panel 110 and move through the passageway 132 of the second grommet body 104. As the mechanic releases the compressive force, the first grommet body 102 may resiliently return towards the non-flexed state. The tabs 146 of the latch features 120 may move into place along the exterior side 148 of the second grommet body 104, as the latch features 120 move farther apart and reorient to the non-flexed state, securing the two grommet bodies 102, 104 in the coupled state.

Figure 10:
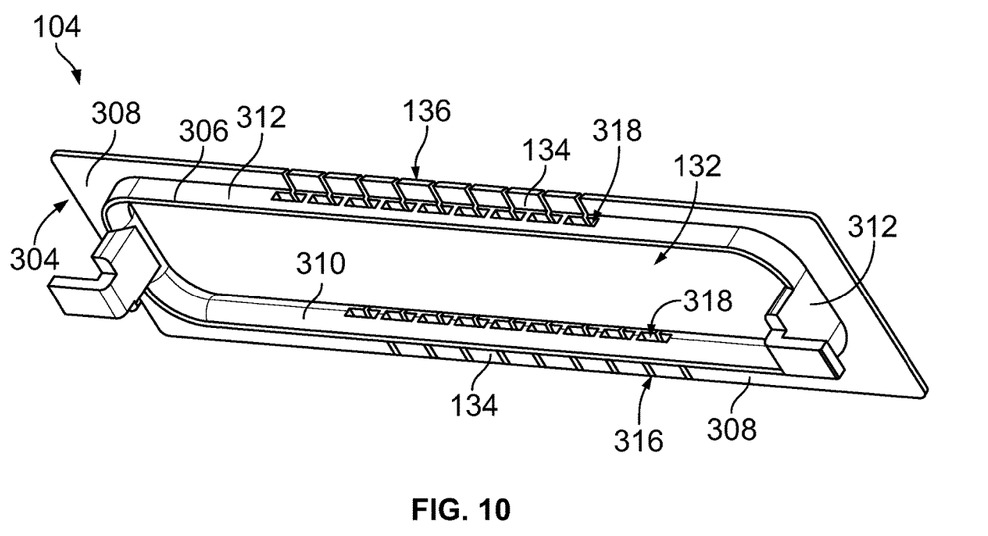
FIG. 10 is an isometric view of a mating end of the second grommet body shown in FIGS. 1, 2, and 9.

FIG. 9 is an isometric view of an exterior end 302 of the second grommet body 104 shown in FIGS. 1 and 2. The exterior end 302 faces away from the panel 110 when installed. FIG. 10 is an isometric view of a mating end 304 of the second grommet body 104 shown in FIGS. 1, 2, and 9. The mating end 304 may extend at least partially into the opening 118 of the panel 110 when installed. The second grommet body 104 may include a base (e.g., second base) 306 and a flange (e.g., second flange) 308. The base 306 has an inner side 310 that defines the second passageway 132. The flange 308 extends from an outer side 312 of the base 306. The flange 308 may contact the second side 114 of the panel 110 when installed to block the second grommet body 104 from falling through the opening 118. Optionally, the flange 308 may include landing pads 314 along the exterior side 148. The landing pads 314 are depressions or detents that are sized and positioned to receive the tabs 146 of the latch features 120 when the flexible grommet assembly 100 is assembled.

The second flexible hinge region 136 may be similar to the first flexible hinge region 126 of the first grommet body 102. For example, the articulated segments 134 of the flexible hinge region 136 may be defined by the base 306 and the flange 308. The articulated segments 134 may be spaced apart by slits 316 and cutouts 318. The cutouts 318 extend through the base 306 from the outer side 312 to the inner side 310. The slits 316 extend through the thickness of the flange 308. Each slit 316 may be fluidly connected to one corresponding cutout 318. The second articulated segments 134 may be T-shaped. The latch features 150 of the second grommet body 104 may extend from a mating side 320 of the base 306. The base 306 may be between the latch features 150 and the flange 308. The latch features 150 may be designed to overlap and optionally contact the first side 112 of the panel 110, as shown in FIG. 2. During the installation process, the mechanic or operator may bend the second grommet body 104 at the flexible hinge region 136, similar to the first grommet body 102 as shown in FIG. 8, to enable the latch features 150 to clear the edge 116 of the panel 110. As the second grommet body 104 resiles, the latch features 150 may move into place along the first side 112 of the panel 110 to secure the second grommet body 104 to the panel 110.

Figure 11:
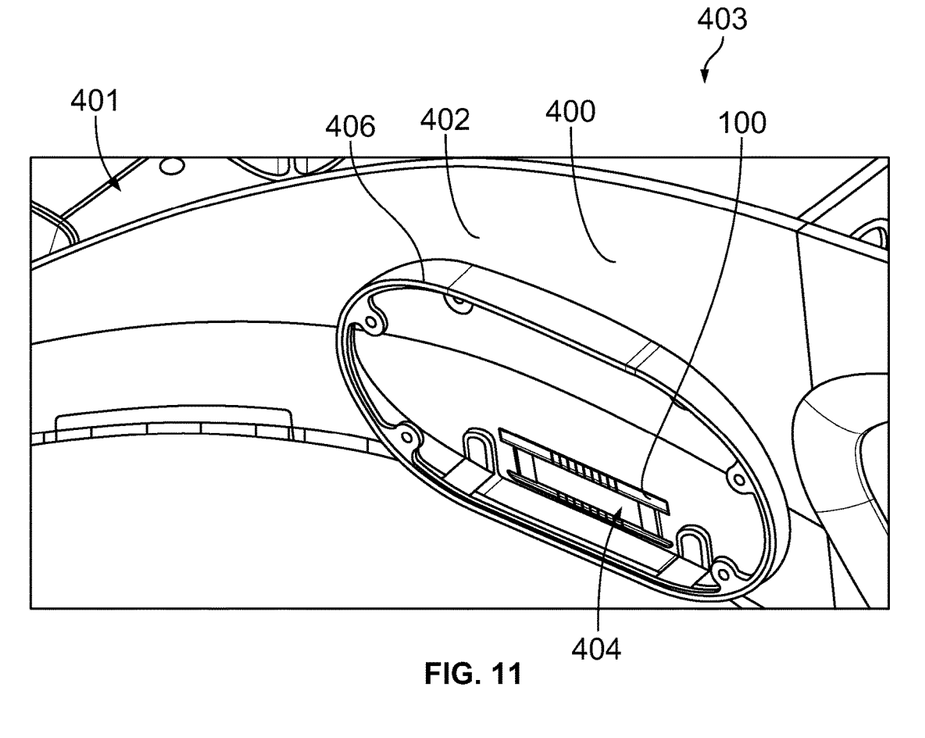
FIG. 11 is an isometric view of the flexible grommet assembly installed on a front side of a panel according to an example application.

FIG. 11 is an isometric view of the flexible grommet assembly 100 installed within an interior cabin 401 of an aircraft 403 according to an example application. The interior cabin 401 may be a passenger cabin, a galley, a lavatory, a cockpit, or the like. The interior cabin 401 includes a panel 400. The panel 400 may be a header panel that extends downward from a ceiling of a cabin. In the illustrated embodiment, the panel 400 is curved. The flexible grommet assembly 100 is installed to the panel 400 at an opening 404 in the panel 400. A bezel 406 is mounted to a front side 402 of the panel 400 and surrounds the flexible grommet assembly 100 and the opening 404. The bezel 406 may be a component of a sign, a light, and/or the like. For example, the bezel 406 may be part of a lighted sign, such as an illuminated exit sign, lavatory sign, seat belt sign, and/or the like.

Figure 12:
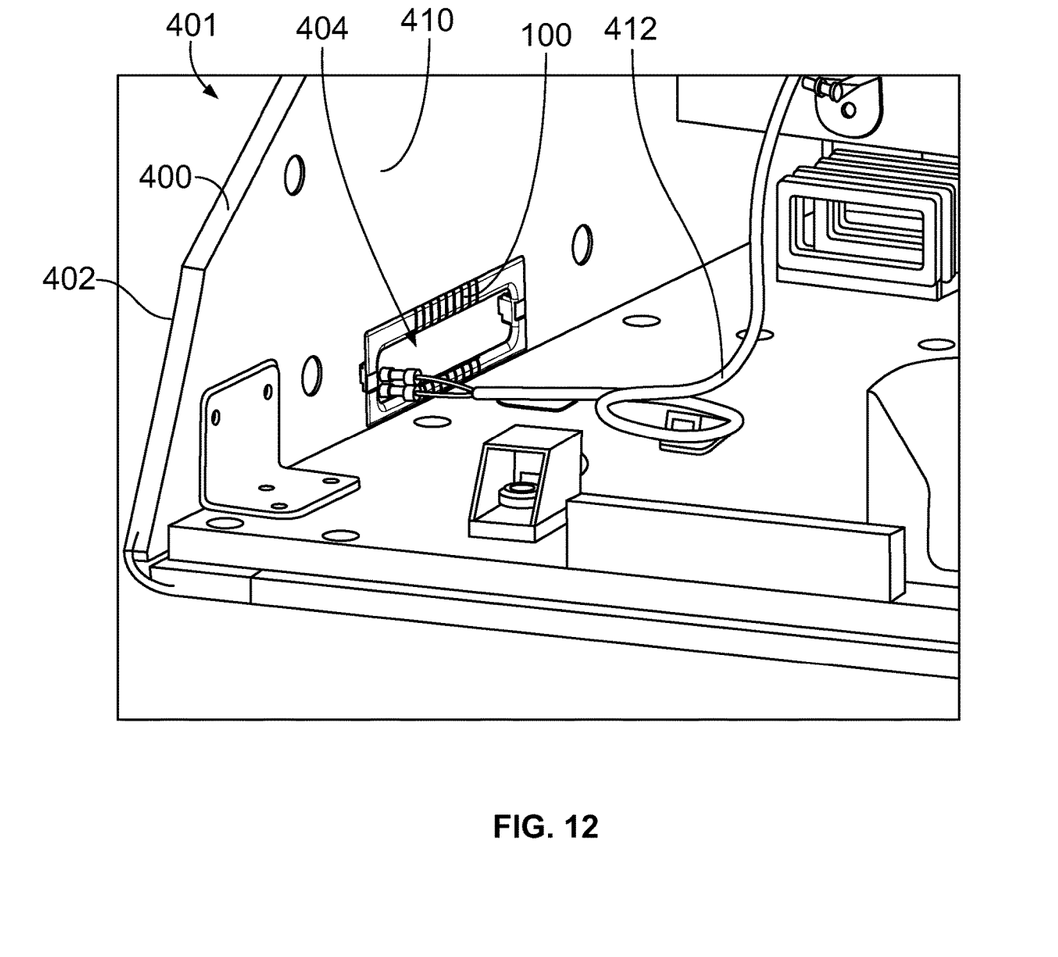
FIG. 12 is an isometric view showing a back side of the panel according to the example application in FIG. 11.

FIG. 12 is an isometric view showing a back side 410 of the panel 400 in the interior cabin 401 according to the example application in FIG. 11. One or more wires 412 may be routed from the area beyond the panel 400 through the opening 404 and the flexible grommet assembly 100 to the front side 402 of the panel 400. The wires 412 may electrically connect to the device with the bezel 406 to provide electrical power and/or control signals to the device. The flexible grommet assembly 100 may protect the wires 412 from damage due to rubbing, pinching, and/or snagging on an edge of the panel 400 that forms the opening 404. The edge of the panel 400 may be unfinished, and sharp or serrated portions of the edge may damage the wires 412.

The flexible grommet assembly 100 described herein can be used for various different applications. For example, the flexible grommet assembly 100 may be installed on panels of other types of vehicles, such as rail vehicles, road vehicles, marine vessels, and/or the like. The flexible grommet assembly 100 can also be used in non-vehicle applications, such as to protect wiring within buildings.

Figure 13:
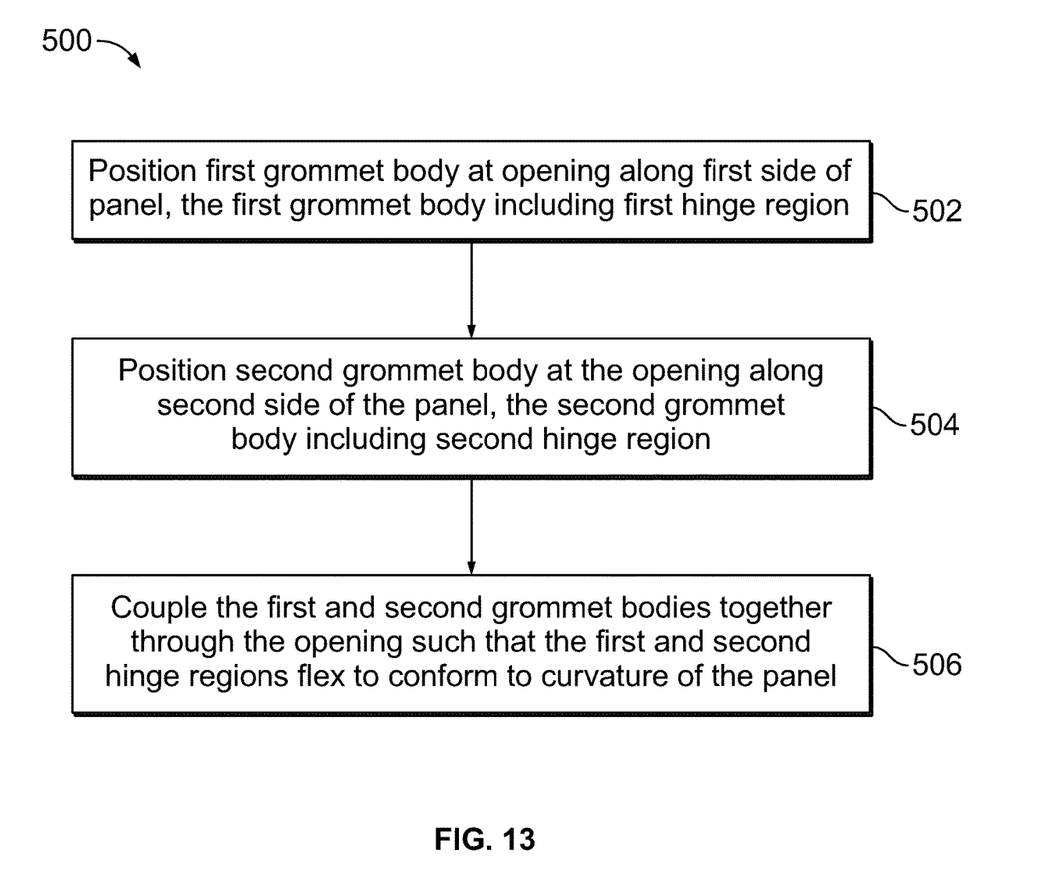
FIG. 13 is a flow chart of a method of installing a flexible grommet assembly on a panel according to an embodiment.

FIG. 13 is a flow chart 500 of a method of installing a flexible grommet assembly 100 according to an embodiment. The method optionally may include at least one additional step than shown, at least one fewer step than shown, and/or at least one different step than shown in FIG. 13. At step 502, a first grommet body 102 is positioned along a first side 112 of a panel 110 at an opening 118 that extends through the panel 110. The first grommet body 102 includes first articulated segments 124 that define a first hinge region 126. At step 504, a second grommet body 104 is positioned along a second side 114 of the panel 110 at the opening 118. The second grommet body 104 includes second articulated segments 134 that define a second hinge region 136.

At step 506, the first and second grommet bodies 102, 104 are coupled together through the opening 118, such that the grommet bodies 102, 104 sandwich the panel 110. When coupled, the first and second grommet bodies 102, 104 are flexed about their respective first and second hinge regions 126, 136 to conform to a curvature in the panel 110. The first grommet body 102 may include latch features 120. The first hinge region 126 may be disposed between the latch features 120. The coupling step may include bending the first grommet body 102 at the first hinge region 126 to force the latch features 120 closer together to clear an edge 116 of the panel 110 as the first grommet body 102 is moved towards the panel 110. Upon returning to the uncompressed or non-flexed state, the latch features 120 may overlap and lock into place behind a portion of the second grommet body 104. The flexible grommet assembly 100 may inherently follow the contour of any curvature in the panel 110 due to the flexible hinge regions 126, 136.

The method optionally may include loading one or more wires 412 through passageways 122, 132 in the first and second grommet bodies 102, 104 and through the opening 118 in the panel 110. The first and second grommet bodies 102, 104 may protect the one or more wires 412 from contacting one or more edges 116 of the panel 110 at the opening 118.

In an embodiment, the first and second grommet bodies 102, 104 may be formed via additive manufacturing. For example, the first grommet body 102 may be formed by sequentially fusing source material layer by layer according to a build plan. Furthermore, additive manufacturing may be used to define the articulated segments 124, 134 of each of the first and second grommet bodies 102, 104. For example, the source material may be selectively fused in the shape of the articulated segments 124, 134 with gaps between the articulated segments 124, 134. The gaps may represent the slits 240, 316 and the cutouts 242, 318. By additively manufacturing the grommet bodies 102, 104, the overall shape of the grommet bodies 102, 104 and the articulated segments 124, 134 can be formed during a single build process. Furthermore, it may be difficult to achieve the intricate details of the articulated segments 124, 134 by conventional processes, such as molding and subsequent etching or other extraction of material to form the articulated segments 124, 134. The first and second grommet bodies 102, 104 may be composed of a plastic material, a flexible metal material, or the like. In an alternative embodiment, the first and second grommet bodies 102, 104 may be formed via injection molding.

Clause 1: A flexible grommet assembly comprising:
a first grommet body comprising first articulated segments that define a first hinge region; and
a second grommet body comprising second articulated segments that define a second hinge region, wherein the first and second grommet bodies are configured to cooperatively couple to an opening of a panel such that the first and second grommet bodies are flexed about their respective first and second hinge regions to conform to a curvature in the panel.

Clause 2: The flexible grommet assembly of clause 1, wherein the first and second grommet bodies are oblong and the first and second hinge regions are disposed at respective middle sections of the first and second grommet bodies along respective lateral lengths of the first and second grommet bodies.

Clause 3: The flexible grommet assembly of clause 1 or clause 2, wherein the first grommet body defines a passageway that aligns with the opening, wherein the first hinge region is defined by a first set of the first articulated segments and a second set of the first articulated segments, the first and second sets disposed on opposite sides of the passageway.

Clause 4: The flexible grommet assembly of any of clauses 1-3, wherein the first grommet body includes latch features, wherein the latch features extend through the opening of the panel and couple to the second grommet body to secure the first grommet body to the second grommet body along opposite sides of the panel.

Clause 5: The flexible grommet assembly of clause 4, wherein the first hinge region is disposed between the latch features along a lateral length of the first grommet body.

Clause 6: The flexible grommet assembly of clause 4 or clause 5, wherein the second grommet body defines a second passageway that aligns with the opening in the panel, and the latch features of the first grommet body extend through the second passageway and contact an exterior side of the second grommet body to secure the first grommet body to the second grommet body.

Clause 7: The flexible grommet assembly of any of clauses 1-6, wherein the first grommet body comprises a base and a flange extending from the base, the base defining a passageway that aligns with the opening in the panel, wherein each of the first articulated segments is defined in part by the base and in part by the flange.

Clause 8: The flexible grommet assembly of clause 7, wherein the first articulated segments are separated from one another by slits through a thickness of the flange and cutouts in the base, with each cutout being fluidly connected to one corresponding slit.

Clause 9: The flexible grommet assembly of any of clauses 1-8, wherein the first articulated segments and the second articulated segments are T-shaped.

Clause 10: The flexible grommet assembly of any of clauses 1-9, wherein the first grommet body includes a continuous strip of solid material extending along a perimeter of a passageway in the first grommet body, wherein the first articulated segments are joined to the continuous strip.

Clause 11: The flexible grommet assembly of any of clauses 1-10, wherein the second grommet body includes second latch features that extend into the opening of the panel, the second latch features configured to contact a first side of the panel.

Clause 12: An aircraft comprising:
an interior cabin including a curved panel, the curved panel defining an opening therethrough; and
a flexible grommet assembly installed on the curved panel, the flexible grommet assembly comprising a first grommet body and a second grommet body, the first grommet body including first articulated segments that define a first hinge region, the second grommet body including second articulated segments that define a second hinge region, wherein the first and second grommet bodies are configured to cooperatively couple to the opening of the curved panel such that the first and second grommet bodies are flexed about their respective first and second hinge regions to conform to a curvature in the curved panel.

Clause 13: The aircraft of clause 12, wherein the first articulated segments contact a first edge of the curved panel that defines the opening along a first side of the curved panel and the second articulated segments contact a second edge of the curved panel that defines the opening along a second side of the curved panel.

Clause 14: The aircraft of clause 12 or clause 13, wherein the first articulated segments and the second articulated segments are T-shaped.

Clause 15: The aircraft of any of clauses 12-14, wherein the first grommet body includes a continuous strip of solid material extending along a perimeter of a passageway in the first grommet body, wherein the first articulated segments are joined to the continuous strip.

Clause 16: The aircraft of any of clauses 12-15, wherein the first grommet body comprises a base and a flange extending from the base, the base defining a passageway that aligns with the opening in the panel, wherein each of the first articulated segments is defined in part by the base and in part by the flange.

Clause 17: The aircraft of clause 16, wherein the first articulated segments are separated from one another by slits through a thickness of the flange and cutouts in the base, with each cutout being fluidly connected to one corresponding slit.

Clause 18: A method of installing a flexible grommet assembly on a panel, the method comprising:
positioning a first grommet body along a first side of a panel at an opening that extends through the panel, the first grommet body comprising first articulated segments that define a first hinge region;
positioning a second grommet body along a second side of the panel at the opening, the second side opposite the first side, the second grommet body comprising second articulated segments that define a second hinge region; and
coupling the first and second grommet bodies together through the opening such that the first and second grommet bodies are flexed about their respective first and second hinge regions to conform to a curvature in the panel.

Clause 19: The method of clause 18, wherein the first grommet body includes latch features with the first hinge region disposed between the latch features, and wherein coupling the first and second grommet bodies together comprises bending the first grommet body at the first hinge region to force the latch features closer together to clear an edge of the panel as the first grommet body is moved towards the panel.

Clause 20: The method of clause 18 or clause 19, further comprising loading one or more wires through passageways in the first and second grommet bodies and through the opening in the panel, wherein the first and second grommet bodies protect the one or more wires from contacting an edge of the panel at the opening.

While various spatial and direction terms such as top, bottom, lower, mid, lateral, horizontal, vertical, front and the like can be used to describe embodiments of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) can be used in combination with each other. In addition, many modifications can be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A flexible grommet assembly comprising:
a first grommet body comprising first articulated segments that define a first hinge region; and
a second grommet body comprising second articulated segments that define a second hinge region, wherein the first and second grommet bodies are configured to cooperatively couple to an opening of a panel such that the first and second grommet bodies are flexed about their respective first and second hinge regions to conform to a curvature in the panel,
wherein the first grommet body includes latch features, wherein the latch features are configured to extend through the opening of the panel and couple to the second grommet body to secure the first grommet body to the second grommet body along opposite sides of the panel.

2. The flexible grommet assembly of claim 1, wherein the first and second grommet bodies are oblong and the first and second hinge regions are disposed at respective middle sections of the first and second grommet bodies along respective lateral lengths of the first and second grommet bodies.

3. The flexible grommet assembly of claim 1, wherein the first grommet body defines a passageway that aligns with the opening, wherein the first hinge region is defined by a first set of the first articulated segments and a second set of the first articulated segments, the first and second sets disposed on opposite sides of the passageway.

4. The flexible grommet assembly of claim 1, wherein the first hinge region is disposed between the latch features along a lateral length of the first grommet body.

5. The flexible grommet assembly of claim 1, wherein the second grommet body defines a second passageway that aligns with the opening in the panel, and the latch features of the first grommet body extend through the second passageway and contact an exterior side of the second grommet body to secure the first grommet body to the second grommet body.

6. The flexible grommet assembly of claim 1, wherein the first grommet body comprises a base and a flange extending from the base, the base defining a passageway that aligns with the opening in the panel, wherein each of the first articulated segments is defined in part by the base and in part by the flange.

7. The flexible grommet assembly of claim 6, wherein the first articulated segments are separated from one another by slits through a thickness of the flange and cutouts in the base, with each cutout being fluidly connected to one corresponding slit.

8. The flexible grommet assembly of claim 1, wherein the first articulated segments and the second articulated segments are T-shaped.

9. The flexible grommet assembly of claim 1, wherein the first grommet body includes a continuous strip of solid material extending along a perimeter of a passageway in the first grommet body, wherein the first articulated segments are joined to the continuous strip.

10. The flexible grommet assembly of claim 1, wherein the second grommet body includes second latch features that extend into the opening of the panel, the second latch features configured to contact a first side of the panel.

11. An aircraft comprising:
an interior cabin including a curved panel, the curved panel defining an opening therethrough; and
a flexible grommet assembly installed on the curved panel, the flexible grommet assembly comprising a first grommet body and a second grommet body, the first grommet body including first articulated segments that define a first hinge region, the second grommet body including second articulated segments that define a second hinge region, wherein the first and second grommet bodies are configured to cooperatively couple to the opening of the curved panel such that the first and second grommet bodies are flexed about their respective first and second hinge regions to conform to a curvature in the curved panel,
wherein the first grommet body includes latch features, wherein the latch features extend through the opening of the curved panel and couple to the second grommet body to secure the first grommet body to the second grommet body along opposite sides of the curved panel.

12. The aircraft of claim 11, wherein the first articulated segments contact a first edge of the curved panel that defines the opening along a first side of the curved panel and the second articulated segments contact a second edge of the curved panel that defines the opening along a second side of the curved panel.

13. The aircraft of claim 11, wherein the first articulated segments and the second articulated segments are T-shaped.

14. The aircraft of claim 11, wherein the first grommet body includes a continuous strip of solid material extending along a perimeter of a passageway in the first grommet body, wherein the first articulated segments are joined to the continuous strip.

15. The aircraft of claim 11, wherein the first grommet body comprises a base and a flange extending from the base, the base defining a passageway that aligns with the opening in the panel, wherein each of the first articulated segments is defined in part by the base and in part by the flange.

16. The aircraft of claim 15, wherein the first articulated segments are separated from one another by slits through a thickness of the flange and cutouts in the base, with each cutout being fluidly connected to one corresponding slit.

17. A method of installing a flexible grommet assembly on a panel, the method comprising:
    positioning a first grommet body along a first side of a panel at an opening that extends through the panel, the first grommet body comprising first articulated segments that define a first hinge region, the first grommet body further comprising latch features;
    positioning a second grommet body along a second side of the panel at the opening, the second side opposite the first side, the second grommet body comprising second articulated segments that define a second hinge region; and
    coupling the first and second grommet bodies together via the latch features of the first grommet body extending through the opening, such that the first and second grommet bodies are flexed about their respective first and second hinge regions to conform to a curvature in the panel.

18. The method of claim 17, wherein the first hinge region is disposed between the latch features, and wherein coupling the first and second grommet bodies together comprises bending the first grommet body at the first hinge region to force the latch features closer together to clear an edge of the panel as the first grommet body is moved towards the panel.

19. The method of claim 17, further comprising loading one or more wires through passageways in the first and second grommet bodies and through the opening in the panel, wherein the first and second grommet bodies protect the one or more wires from contacting an edge of the panel at the opening.

\* \* \* \* \*